United States Patent [19]

Macon, Jr. et al.

[11] Patent Number: 5,560,018

[45] Date of Patent: Sep. 24, 1996

[54] PROVIDING EXTERNAL INTERRUPT SERIALIZATION COMPATIBILITY IN A MULTIPROCESSING ENVIRONMENT FOR SOFTWARE WRITTEN TO RUN IN A UNIPROCESSOR ENVIRONMENT

[75] Inventors: James F. Macon, Jr., Boynton Beach; David Medina, Boca Raton; Mark A. Peloquin, Boynton Beach, all of Fla.

[73] Assignee: International Business Machines Corporation, Armonk, N.Y.

[21] Appl. No.: 358,158

[22] Filed: Dec. 16, 1994

[51] Int. Cl.⁶ ........................................... G06F 13/00
[52] U.S. Cl. ................. 395/733; 395/474; 395/868; 364/DIG. 1; 364/230; 364/230.2; 364/230.3
[58] Field of Search ............................ 395/726, 650, 395/375, 425, 733, 474, 868

[56] References Cited

U.S. PATENT DOCUMENTS

| | | | |
|---|---|---|---|
| 4,261,034 | 4/1981 | Saccomano et al. | 395/726 |
| 4,271,468 | 6/1981 | Christensen et al. | 395/726 |
| 4,604,500 | 8/1986 | Brown et al. | 379/269 |
| 4,604,694 | 8/1986 | Hough | 395/726 |
| 4,663,709 | 5/1987 | Fujiwara et al. | 395/740 |
| 4,809,168 | 2/1989 | Hennessy | 395/650 |
| 4,920,485 | 4/1990 | Vahidsafa | 395/730 |
| 4,979,105 | 12/1990 | Daly et al. | 395/182.08 |
| 5,075,846 | 12/1991 | Reininger et al. | 395/478 |
| 5,161,227 | 11/1992 | Dias et al. | 395/650 |
| 5,175,829 | 12/1992 | Stumpf et al. | 395/375 |
| 5,218,712 | 6/1993 | Cutler et al. | 395/800 |
| 5,257,372 | 10/1993 | Furtney et al. | 395/650 |
| 5,274,809 | 12/1993 | Iwasaki et al. | 395/650 |
| 5,274,823 | 12/1993 | Brenner et al. | 395/725 |
| 5,307,504 | 4/1994 | Robinson et al. | 395/800 |
| 5,440,746 | 8/1995 | Lentz | 395/290 |
| 5,442,763 | 8/1995 | Bartfai et al. | 395/375 |
| 5,448,732 | 9/1995 | Matsumoto | 395/650 |

OTHER PUBLICATIONS

Transformation of Simple Locks in Pageable Kernel, P. L. De Backer, J. S. Peek, Technical Disclosure Bulletin, v36, n3, Mar. 1993, pp. 385–386.

*Primary Examiner*—Ayaz R. Sheikh
*Attorney, Agent, or Firm*—Lowe, Price, LeBlanc & Becker; Ray Strimaitis

[57] ABSTRACT

Methods and apparatus provide external interrupt serialization compatibility for a multiprocessing environment so that software written to run in a uniprocessor environment can run without degradation caused by inadequate or improper handling. When a processor receives an external interrupt, the interrupt manager will acquire an external interrupt spinlock. Once acquired, the interrupt manager will transfer control to the external interrupt service routine and upon return from that routine, the interrupt manager will release the external interrupt spinlock. Also, protection of processor execution state in a multiprocessor environment is provided using the same spinlock.

8 Claims, 4 Drawing Sheets

PROVIDING EXTERNAL INTERRUPT SERIALIZATION COMPATIBILITY IN A MULTIPROCESSING ENVIRONMENT FOR SOFTWARE WRITTEN TO RUN IN A UNIPROCESSOR ENVIRONMENT

BACKGROUND OF THE INVENTION

1. Field of the Invention

The invention is directed to computer systems and more particularly to the handling of interrupts in a multi-processor environment.

2. Description of Related Art

Computer systems contain external devices that require the occasional attention of the central processor, such as keyboards, disk and diskette drives, and printers. One method of servicing external devices is to test them frequently to determine which, if any, require attention. This method, usually called polling, wastes considerable time in checking devices that do not need service. A more efficient method is to allow each device to interrupt the CPU whenever it wants. Compared with polling, the interrupt method substantially increases system performance.

An interrupt system can be described as a mechanism that allows the central processing unit to respond to unpredictable events. When an interrupt signal is received, the CPU immediately diverts its attention from the task currently executing, but in a manner that allows the future resumption of this task. The processor then executes a routine that is specific to each particular interrupt. In many microprocessors interrupts may be classified as follows:

1. Internal interrupts are those that originate inside the CPU. For example, the divide by zero interrupt is typically an internal interrupt.

2. External interrupts are those initiated by external hardware. External interrupts are signaled to the CPU on an interrupt request line (INTR) or on a nonmaskable interrupt line (NMI). On many microcomputers the INTR line is driven by an Intel 8259A programmable interrupt controller.

3. Software interrupts are those initiated by an INT or INTO instruction.

An external interrupt is a means whereby a source, external to the processor can asynchronously signal the processor to transfer control immediately to a piece of software that is responsible for servicing the source of the external interrupt. Multiple external interrupt requests are sometimes handled by a priority mechanism which allows the highest priority external interrupt to be recognized by the processor before other lower priority external interrupt requests.

External interrupt serialization allows software to prevent a processor from recognizing external interrupts or to allow the processor to recognize external interrupts. In the prior art, external interrupt serialization techniques were applied to single (uniprocessor) systems. There are two major areas where external interrupt serialization has been employed.

Most internal, external, or software interrupts present to the CPU a specific signature, which is encoded in a byte that follows the interrupt opcode. This signature, sometimes called the interrupt type, serves to identify each interrupt to the CPU. However, interrupts generated by a breakpoint or by the INTO (interrupt on overflow) instruction do not contain a signature byte. Interrupts are presented to a processor over a bus activating one or more interrupt pins of the processor chip.

The Intel™ 8259A programmable interrupt controller (PIC) is an integrated circuit designed to manage the external interrupts in a microcomputer system. The 8259A is used in many microcomputers although it is not always configured in the same manner. For example, some microcomputers use a single 8259A chip, while others use two 8259A controllers. Furthermore, the 8259A controllers used can be initialized to be triggered differently.

Figure 1:
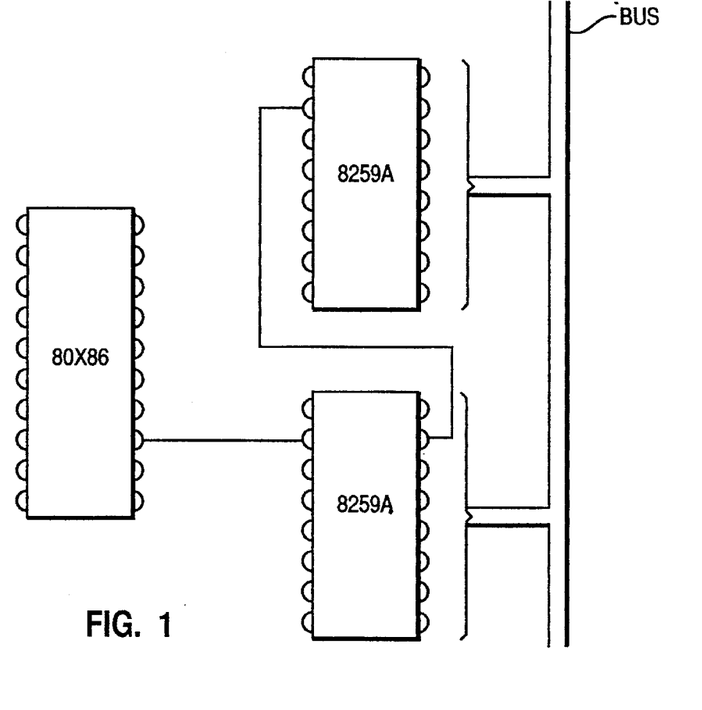
FIG. 1 is a depiction of the relationship between a processor chip and interrupt controllers in one configuration of the prior art.

Some microprocessors have two physical lines to signal interrupts, designated as INTR and NMI. The INTR line (interrupt request) may be driven by an Intel 8259A interrupt controller as shown in FIG. 1. In this type of configuration, all interrupt-driven external devices are connected to the 8259A. The original purpose of an NMI line was to warn the microprocessor of an impending catastrophic event, like an imminent power failure, or of a parity error in memory. But some systems use this line for other purposes; for instance, the NMI line may be attached to the keyboard circuit, and in some systems with a math coprocessor, the NMI line is used to report an error exception.

The 8259A handles interrupts that originate in up to eight external devices by assigning a unique code to each interrupt source. This code, call the interrupt type code, is used by the CPU in locating, in a vector table, the address of the corresponding service routine. Interrupts that originate in the 8295A are maskable; that is, they can be individually enabled and disabled by programming the controller's interrupt mask register. In addition, all external interrupts can be temporarily disabled by clearing the processor's interrupt flag (IF) or by resetting IF, thus reenabling external interrupts. The term nonmaskable interrupt is used to designate all interrupts that do not originate in the 8295A interrupt controller and are not affected by the processor's interrupt flag.

In systems that use a single 8295A chip, all external interrupts are mapped to eight lines, designated as IRQ0 to IRQ7. In systems using two 8295A chips, designated as interrupt controllers 1 and 2 there are a total of 16 interrupt lines, IRQ0 to IRQ15. Since IRQ2 is used to cascade the interrupts from controller number 2, it is not assigned to any specific interrupt.

The hardware protection mechanisms of the Intel™ 80X86 family of processors serve to achieve the following functions:

1. System software is isolated from application programs.
2. Tasks execute independently of one another.
3. Segments are used according to their data types.

Protection is implemented by establishing limitations on the use of memory and by restricting the instruction set available to applications. The degree of limitation is determined by a hierarchy of four privilege levels supported by the 80X86. Nevertheless, system programs do not have to enable all privilege levels; for example, the OS/2 operating system uses only three of the four privilege levels available on the processor chip.

| Applications | level 3 | (least privileged) |
| --- | --- | --- |
| Custom extensions | level 2 | |
| System services | level 1 | |
| Kernel | level 0 | (most privileged) |

Figure 2:
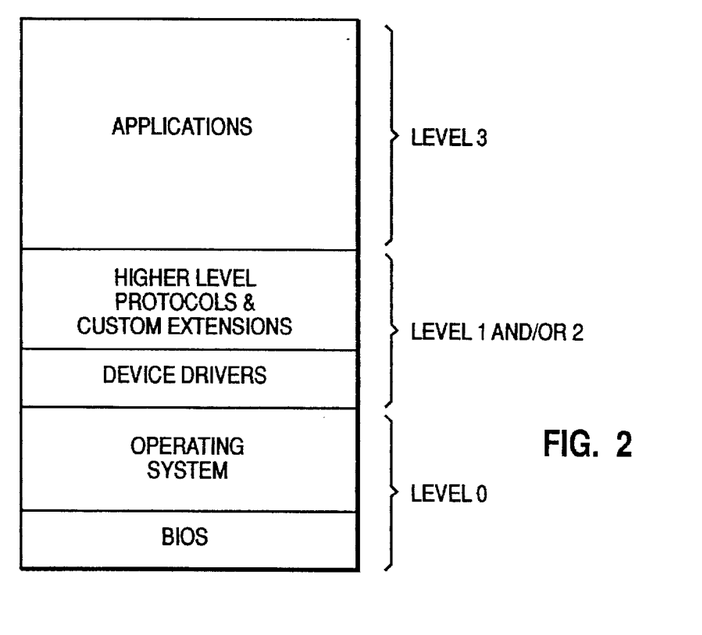
FIG. 2 is an illustration of a software hierarchy together with typical levels of privilege authorized for software within the hierarchy.

FIG. 2 illustrates a common software hierarchy which show typical assignments of privilege levels. The privilege level is controlled through three privilege-level indicators:

1. DPL (descriptor privilege level). The value of the DPL is stored in the access rights byte of each descriptor. Its value indicates the privilege level of an entire segment of storage.

2. CPL (current privilege level). The CPL is stored in the current code segment selector. It indicates the privilege level of the task currently executing.

3. RPL (requested privilege level). The RPL is stored in bits of a segment selector. The RPL differs from the CPL in that the CPL refers to a code segment selector, while the RPL can refer to any segment.

The 80X86 processor architecture follows specific rules for granting access to data and code segments. For instance, data access is granted if DPL≧CPL—in other words, if the privilege level of the data segment is lower than or equal to the privilege level of the current code segment. Note that the higher the privilege level, the lower the numerical value of DPL, CPL, and RPL. Regarding other code segments, access is granted if CPL=DPL, but more privileged code segments can be accessed via special descriptors called call gates.

The 80X86 processor architecture provides four levels of protection as mentioned above for which an OS may choose to place code and data for the OS itself, device driver, subsystems and applications. These are more commonly referred to as Ring 3, 2, 1 and 0. The lower the ring, the more protection is available. An operating system such as OS/2 chose an architecture that utilizes three of the four protection rings, Ring 3, 2, and 0. Application code and data which need a minimum amount of protection reside at Ring 3. Subsystems code and data that require more protection than Ring 3 reside at Ring 2. The OS kernel and device drivers reside at Ring 0.

There are two classes of input/output I/O instructions distinguished by their OP codes. The first class of I/O instructions performs I/O to devices. The second class of instructions are PAEIS instructions. I/O protection is implemented using a combination of two mechanisms. First, there is an I/O privilege level field in the flags register of the processor which contain one of the four rings 0, 1, 2 or 3. Secondly, an I/O permission bit map in the Task State Segment (TSS) controls access to individual ports in the I/O address space. An I/O permission bit map is not always required. For example, if the I/O privilege level (IOPL) is set to 2 then code segments which execute at protection level 2 can execute both classes of I/O instructions without requiring an I/O permission bit map.

The unit of execution for the 80X86 CPU is called a task. The term thread of execution is sometimes used in a similar context. The microprocessor can execute only one task at a time. The CPU switches tasks as a result of an interrupt or of execution of certain instructions. The 80X86 hardware provides complete isolation between tasks. This isolation is based, among other things, on each task having its own independent address space.

The currently executing task is defined by the contents of the processor registers. This is known as the task or processor state. The task register, which is part of 80X86 CPU, contains a selector to the descriptor of the current task. The task segment descriptor has the same 8-byte structure and format as the other 80X86 segment descriptors.

Some external devices controlled by a microprocessor have a timing requirement in which the programming of some or all steps must take place within a certain time span, otherwise the results required cannot be obtained. If external interrupts are allowed to be recognized by the processor while these steps are executing then the external interrupt service routine could prevent the necessary steps from occurring in a timely fashion and thus the desired results might not be achieved. To prevent any delays of this nature from occurring, software that programs timing sensitive devices can prevent external interrupts from occurring using a Processor Architecture External Interrupt Serialization (PAEIS) facility native to the processor or added on at design time.

The software most frequently implemented for controlling an external device is called a device driver. The device driver typically consists of two sections, a task time section which executes when an external interrupt is not in progress and an interrupt time section which executes when an external interrupt is in progress. There are two considerations that must be taken into account by the device driver.

The first is that some aspects of devices require a strict ordering of steps for their programming. For example, as illustrated in FIG. 3, a single register X on a device may serve as an address register which contains the I/O port address for the subsequent read or write from a data port.

Figure 3:
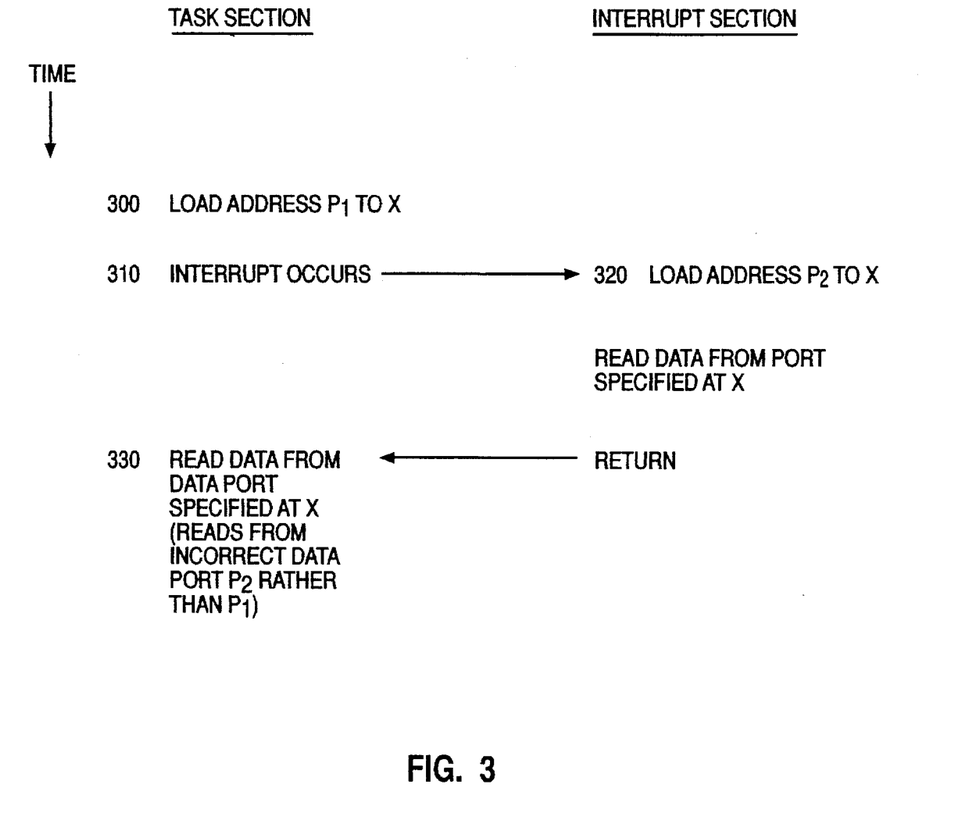
FIG. 3 illustrates task processing and interrupt processing which can lead to an error condition.

FIG. 3 illustrates the interaction between task processing (left side) and interrupt processing (right side). If at task time the device driver wanted to read from port P1, it would load the address register with P1 (300) the address of data port P1, and then read from data port D. Since the loading of address register and the reading of the data port require multiple instructions there exists a window of opportunity where the task time section could read from the incorrect port.

Consider the following scenario illustrated in FIG. 3: if an external interrupt (310) would occur after the task time section has loaded the address register with P1 and the interrupt time section wanted to read from data port P2 it would then load the address register with P2 and then read from data port P2. When execution returned to the task time section he would then read from the data port specified in the address register (330), but the address register contains P2 instead of P1, so it reads from the incorrect port. To protect against this a PAEIS mechanism would be used to prevent an external interrupt from being recognized by the processor until the data has been read from the data port D.

A second consideration is that typically the task time section will add work items to a queue if the device is currently busy. The interrupt time section will remove elements from the queue upon completion of a previous element. Since both task time and interrupt sections are accessing the same queue, a PAEIS mechanism must be used to guarantee that links for the queue do not get corrupted.

In advanced operating systems (OS) where multiple threads are allowed to execute in a multiprogramming (multi-tasking) environment, one of the functions of the OS is to allocate the processor to the runnable threads. Two primary methods are used for making the decision:

A. An OS will typically use a hardware timer for determining when a thread should share the processor with a similar thread at the same priority (round robin).

B. When an external interrupt occurs, it can signal the completion of an event for which some thread was waiting on. If the thread is higher in priority than the currently executing thread a preemption should occur.

In these environments the programmer must use proper serialization techniques to protect his code/resources because at any given time the OS may decide to give the processor(s) to another runnable thread which may also require execution of the same code path or the use of the same resource. The primary mechanism in the prior art for such serialization is the semaphore. Semaphores are well-known in the art. However, semaphore packages themselves sometime require serialization to prevent from being preempted. Since a semaphore package cannot reuse itself because this could lead to an infinite loop, other serialization mechanisms must be used. One of the serialization mechanisms that can be used by semaphore packages is Processor Architected External Interrupt Serialization (PAEIS). By preventing external interrupts from being recognized by the (single) processor, the semaphore package implicitly disables round robin or preemption. Therefore, any modifications or queries can be done to the semaphore data without anyone else modifying or querying the semaphore.

The use of the PAEIS mechanism provides the necessary functionality required in a uniprocessor environment. However, in a multiprocessor (MP) environment there is no equivalent functionality. As stated before, the existing PAEIS functionality is only applicable to the processor which issued the PAEIS instruction(s) to prevent or allow external interrupts. For example if the thread executing on processor A prevents external interrupts from occurring, processor B could still be allowed to execute the code at the same time that processor A was trying to protect it. Since with PAEIS the software expects only one execution instance through the piece of code in the prevent/allow external interrupts section, unpredictable results may occur when multiple processors are used.

SUMMARY OF THE INVENTION

Accordingly, one advantage of the invention is to provide external interrupt serialization in a multiprocessing environment.

Another advantage of the invention is to permit software written for a uniprocessor environment to run in an multiprocessor environment without interrupt conflict.

Another advantage of the invention is that it permits devices having strict timing requirements to operate without time-out caused by external interrupts.

Another advantage of the invention resides in the avoidance of incorrect serial port addressing resulting from a change in address during interrupt handling.

Another advantage of the invention resides in permitting different processes to access the same queue without corruption of the links for the queue.

Another advantage of the invention resides in serialization of resources so that execution is not corrupted as a result of interrupt handling.

Another advantage of the invention resides in provision of interrupt handling so that unpredictable results will not occur.

These and other objects and advantages of the invention are achieved in a multiprocessor computing system having shared memory by methods and apparatus detecting instructions of one class of instructions, receiving external interrupt requests, determining whether said instructions of one class require preventing of external interrupts, preventing external interrupts by acquiring a spinlock by placing a SET indication in shared memory in response to said means for determining, and by executing an external interrupt service routine appropriate to that external interrupt when the spinlock is not acquired by first acquiring the spinlock, executing an external interrupt service routine and by releasing the spinlock when execution of the interrupt service routine has been completed.

There are two ways for determining whether instructions of one class require preventing of external interrupts. The first involves setting the I/O permission level for all external I/Os to level 0 and using an I/O permission bit map to grant access to I/O ports, and then asserting an exception upon receipt of an instruction of said one class.

The second way involves recognizing only two privilege levels, changing the privilege levels of any intermediate unrecognized privilege level to the privilege level recognized with the fewest privileges, and then asserting an exception upon receipt of an instruction of said one class.

Another aspect of the inventions involves providing external interrupt serialization in a multiprocessor environment by receiving an interrupt, checking the state of a spinlock located in memory shared by each processor and if the spinlock is in one state, repeatedly checking the spinlock until it is in a second state. If the spinlock is in said second state changing the state of the spinlock to said one state and processing the interrupt. Processing of interrupts occurs by accessing an interrupt vector list to determine the starting address of an interrupt handler for the type of interrupt to be processed, executing an interrupt services routine found at said starting address, releasing said spinlock; and returning to program execution as it existed prior to the receipt of said interrupt.

Another aspect of the invention involves a method for protecting execution state in a multiprocessor environment from external interrupts by requiring external interrupts acquire a spinlock located in memory shared by each processor prior to execution of an interrupt service routine. When a protect command is received, the state of said spinlock is checked. If the spinlock is in an acquired state, the spinlock is repeatedly checked until it is in a second state. If the spinlock is in the second state the state of the spinlock is changed to said acquired state to prevent external interrupts from being processed. The spinlock is released when an unprotect command is received.

This invention effectively allows only one processor to be inside of a "prevent/allow external interrupts" section at a time, while also preventing external interrupts from being serviced by the external interrupt service routine. Additionally, while an external interrupt is being serviced by a processor no other processor will be allowed to enter into a "prevent/allow external interrupts" section. Therefore, this invention provides PAEIS compatibility in a multiprocessor environment.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE ILLUSTRATIVE EMBODIMENT(S)

Since each processor architecture will have a somewhat different implementation of this invention, it is impractical to describe each implementation but the principles of the invention will be illustrated by describing the implementation on the 80X86 processor architecture.

When an External Interrupt is received, the First Level Interrupt Handler (FLIH) will decide if an interrupt should be services by the Interrupt Service Routine at this time. (ISR). The determination is made by attempting to acquire the external interrupt serialization spinlock.

A spinlock is software technique providing a low level and efficient method for serialization in a MP environment. Spinlocks are acquired and released. When acquired only the owner can execute a protected piece of code. All other requesters must wait for the owner to release ownership of the spinlock before they can acquire ownership. When the owner has completed execution of the protected code, the spinlock is released.

The mechanism to acquire a spinlock consists of the following:

A. A shared memory location must exist which is accessible by all processors.

B. The shared memory location's contents consists of two possible states, Clear and Set.

C. (300) The act of acquiring a spinlock consists of the following:
  1. Determine if the spinlock is Clear or Set by examining the contents of the shared memory location.
    A. If the shared memory location is Set then the lock is owned and repeated attempts are made to acquire the spinlock. This technique is known as spin on read. It was chosen because it minimizes traffic on the system bus which increases system performance.
    B. If the shared memory location is Clear then the spinlock is not owned and a task can attempt to acquire ownership.
      1. An attempt to own the spinlock entails executing a processor architected instruction which atomically swaps the contents of the shared memory location with a register that contains the value of SET. For the direction of the atomic swap, the system bus is locked to prevent access from any other source. What is returned in the register after the atomic swap is indication of the ownership status of the spinlock prior to the atomic swap.
        A. If Clear is returned we know the spinlock was previously unowned and that we have not become the new owner of the spinlock.
        B. If Set is returned we know the spinlock was previously owned and that we must return to step (300). Since the spinlock was originally Set and because we swapped in a SET value no further modifications of the shared memory location are required.

D. The act of releasing a spinlock consists of storing a Clear in the shared memory location. The spinlock considered to be unowned at this time.

This invention furthermore involves the process of detecting when a PAEIS instruction is executing. An exception handler is provided to detect PAEIS instructions. If a PAEIS instruction is being executed a determination is made of which PAEIS instruction is being executed. If the PAEIS instruction prevents external interrupts from being serviced, the external interrupt spinlock will be acquired. If the PAEIS instruction allows external interrupts to be serviced then the external interrupt spinlock will be released. This invention further recognizes that multiple prevent external interrupt instructions may be detected before an allow external interrupt instructions may be detected before an allow external interrupt instructions and provisions will be made appropriately such as keeping a count of the number of times the prevent request has occurred. The spinlock will only be released when the count of prevents reaches 0. The prevent count is decremented when an allow external interrupt instruction is detected.

There are two methods in which we can detect PAEIS instructions on the 80X86 processor architecture:

First, it is possible to change the protection architecture from Ring 3, 2, and 0 to Ring 3 and 0 (user/supervisor) which most advanced OS's employ today. I/O access could be granted through the I/O permission bit map. The application loader would be responsible for ensuring that all subsystem code selectors are given Ring 3 protection. Any subsystem software which then executed PAEIS instructions would cause a processor exception to occur. The disadvantage of this method is that there are some subsystems which have dependencies on the Ring architecture which they are executing. They assume that a Ring 3, 2, and 0 architecture is present. The method would cause those subsystems to either be rewritten or incompatible. This method does have one small advantage in that the data required for Ring 2 protection and privilege level such as Ring 2 stacks could be eliminated.

Second, it is possible to change the IOPL to 0 and create an I/O permission bit map which grants access to all I/O ports. This would allow the first class of I/O instruction to execute without any exceptions but the second class of instructions (PAEIS) would generate an exception. This method is the preferred method because it does not require any changes to the subsystem and none of them become incompatible.

Figure 4:
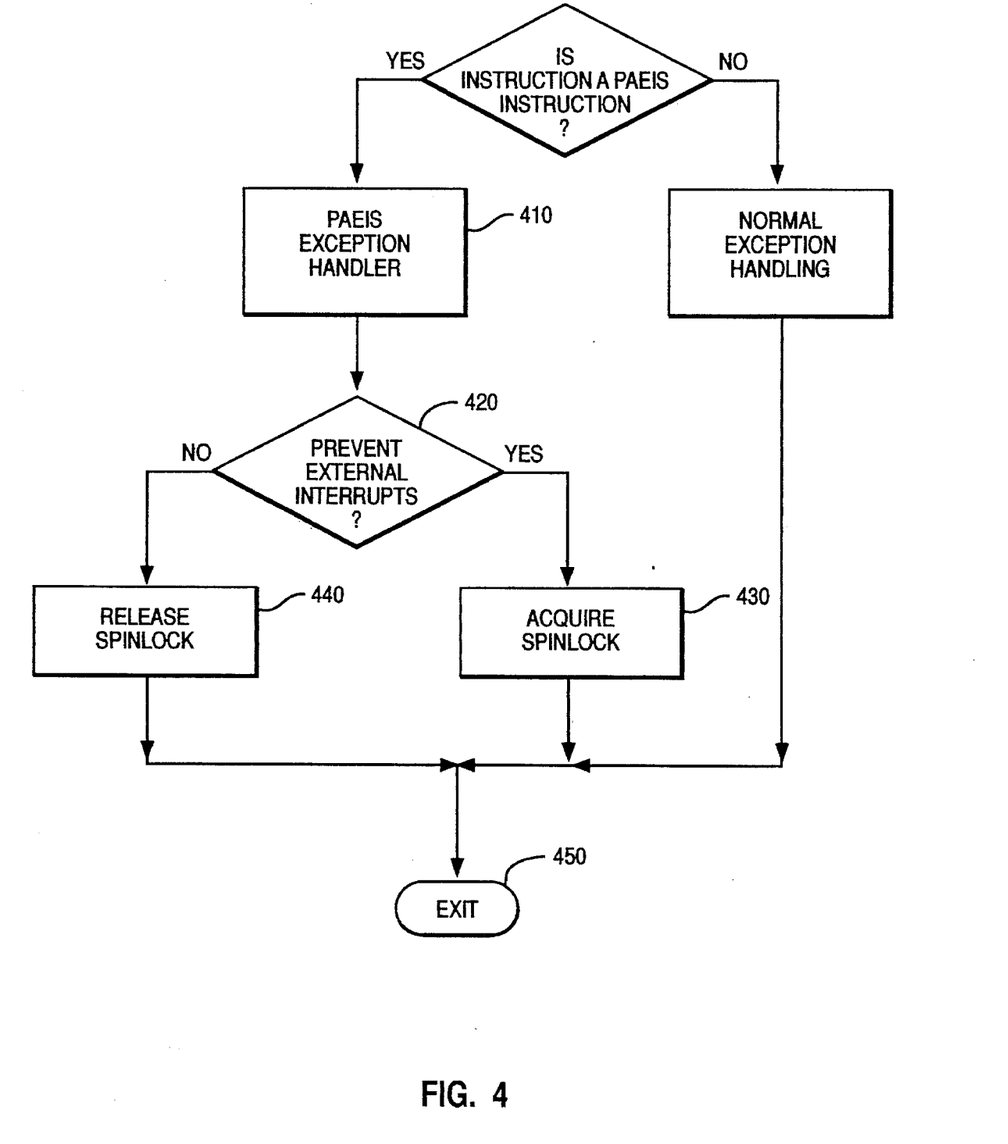
FIG. 4 is an illustration how to protect an execution state from corruption by interrupts.

FIG. 4 shows when a processor detects a PAEIS instruction and an exception is noted. Exception handler 410 determines if the instruction is either a prevent or allow external interrupt instruction 420. If the instruction is a prevent external interrupt instruction the external interrupt spinlock is acquired 430 and we exit the handler 450. If the instruction is an allow external interrupt instruction the external interrupt spinlock is released 440 and we exit the handler 450.

Figure 5:
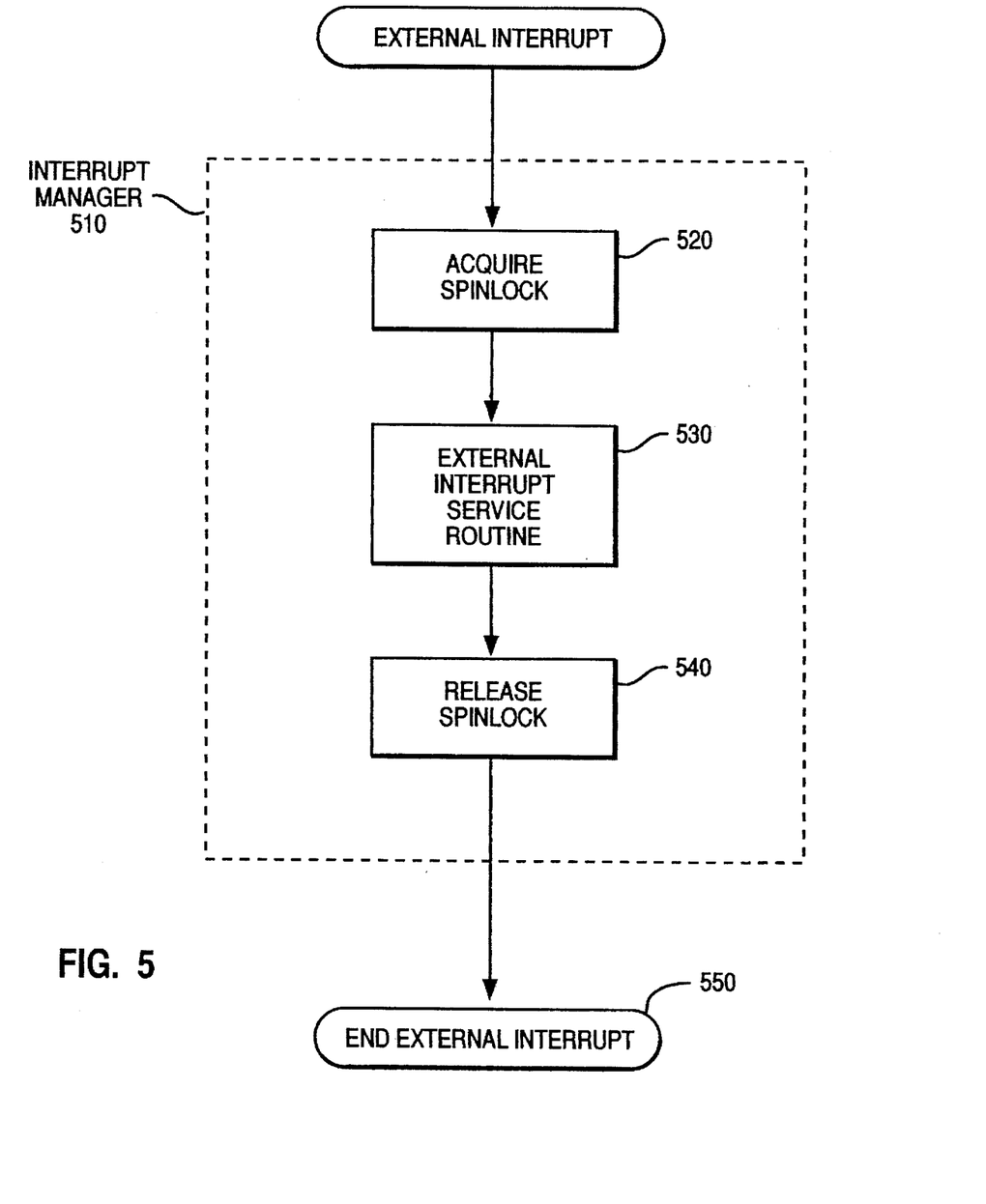
FIG. 5 is an illustration of how interrupts are processed.

FIG. 5 shows when the processor has acknowledged the occurrence of an external interrupt, control is passed to the interrupt manager 510. The external interrupt spinlock is acquired 520. Control is then passed to the external interrupt service routine 530. The external interrupt spinlock is then released 540. We then exit the interrupt manager 550.

These and other advantages of the invention hence are achieved by providing a mechanism that allows the OS to detect when a PAEIS instruction(s) are being executed by user level software. Once detected the OS employs a NMP serialization technique that allows only one thread to be executing inside of a prevent external interrupt and allow external interrupt section. It does allow external interrupts to be recognized by processor(s) while a thread is inside of a prevent external interrupt and allow interrupt section, but does not allow the processor(s) recognizing the external interrupt to execute the external interrupt service routine. If an external interrupt service routine is processing an external interrupt and another processor detects a prevent external interrupt instruction sequence, it will suspend execution until the other processor has completed servicing the external interrupt. Therefore, software written to run on a single processor will still execute correctly with the expected results in a multiprocessor environment.

What is claimed is:

1. In a multiprocessor computing system having memory shared by all processors in said computing system, apparatus for providing serialization throughout said system of the handling of external interrupts, relative to currently executing program tasks written to run in a uniprocessor environment, said system comprising:

means in each processor of said system for detecting execution in the respective processor of instructions of one class of instructions; said instructions of one class being architected for use in a uniprocessor environment to indicate whether external interrupt requests, presented during execution of program task segments containing said instructions of one class, should or should not be serviced prior to completing execution of respective task segments; said instructions of one class thereby being useful to selectively prevent servicing of external interrupt requests from interfering with timely execution of time-sensitive functions defined by individual said program tasks;

means in each processor of said system for receiving external interrupt requests;

means in each processor of said system, cooperative with said instruction execution detecting means in the respective processor, for determining whether said instructions of one class require preventing of servicing of external interrupt requests received by said receiving means;

means in each said processor, responsive to a determination that a said instruction of one class requires preventing received external interrupt requests from being serviced, for preventing servicing of external interrupt requests received by said receiving means of all processors of said system; said means for preventing servicing of received external interrupt requests acting to acquire exclusive control of a spinlock in said shared memory; which effectively prevents all processors of said system from servicing external interrupt requests until said exclusive control of said spinlock is relinquished; and means in each said processor, effective when said spinlock is uncontrolled, for permitting servicing of an external interrupt request received by the respective receiving means; said means for permitting servicing requiring the respective processor to acquire exclusive control of said spinlock and thereafter execute an external interrupt service routine appropriate to said external interrupt request received by the respective receiving means, said spinlock being released when execution of said interrupt service routine has been completed.

2. The apparatus of claim I in which said processors of said system have I/O ports, addressable through an I/O address space, and programmable protection functions for restricting access to said ports; said protection functions including I/O privilege level indicators designating privilege levels of I/O operations, and permission bit maps defining access of I/O task segments to said I/O ports; and wherein said instructions of one class are used in I/O task segments accessing said I/O ports; and wherein said means for determining whether said instructions of one class require preventing servicing of external interrupt requests comprises:

means for setting said I/O privilege level indicators to a most protected level 0 and using an I/O permission bit map to grant unrestricted access to I/O ports of said system, and means responsive to settings of said privilege level indicators and permission bit map for causing execution of an instruction of said one class, in any processor of said system, to give rise in the respective processor to an exception indication unique to said instructions of said one class, said exception indication requiring the respective processor to determine specifically whether the respective instruction being executed is one preventing or permitting servicing of external interrupt requests.

3. The apparatus of claim 1 in which said processors of said system have I/O ports locatable through an I/O address space and programmable protection functions restricting access to said ports; said protection functions including I/O privilege level indicators useful to define n (n greater than 2) privilege levels, including a highest level, a lowest level, and at least one level intermediate said highest and lowest levels; and in which said instructions of one class are used in program task segments accessing said I/O ports; and wherein said means for determining whether said instructions of one class require preventing of external interrupts comprises:

means conditioning said processors individually to recognize only said highest and lowest privilege levels;

means for changing said intermediate privilege levels to a predetermined one of said highest and lowest levels; and means responsive to said recognized privilege levels and execution of an instruction of said one class for causing generation of an exception during execution of an instruction of said one class.

4. In a multiprocessor computing system having memory shared by all processors of said system, a method for providing serialization throughout said system of the handling of external interrupt requests presented during execution by any one of said processors of program tasks written to run in a uniprocessor environment, said method comprising, in each said processor:

detecting execution of instructions of one class of instructions that are used in said program tasks to indicate whether respective tasks require or do not require preventing external interrupt requests from being serviced during execution of respective tasks;

receiving external interrupt requests;

determining whether said detected instructions of one class require preventing external interrupt requests from being serviced during execution of tasks containing respective said detected instructions;

preventing servicing throughout said system of external interrupt requests presented during execution, in any said processor, of a task containing an instruction of said one class detected during said detecting step; said preventing step entailing having the processor detecting execution of a said instruction of one class acquire a spinlock in said shared memory;

when said spinlock is free, executing an external interrupt service routine appropriate to any received said external interrupt request; said service routine entailing first acquiring said spinlock, then executing said appropriate external interrupt service routine for attending to the respective received external interrupt, and then releasing the spinlock when execution of said appropriate external interrupt service routine has been completed.

5. The method of claim 4 in which said system contains I/O ports designated by addresses in an I/O address space recognized by said processors of said system, in which access to said ports, of program tasks executed by individual said processors of said system, is programmably restrictable by an I/O permission bit map, and in which said instructions of one class are used in program tasks requiring access to said I/O ports; and wherein said step of determining whether said instructions of one class require preventing of servicing of external interrupt requests received during execution of program tasks containing respective said instructions comprises:

using an I/O permission bit map to grant access to I/O ports, and in response to said bit map, asserting an exception upon execution of an instruction of said one class requiring the processor executing the respective instruction to acquire control of said spinlock.

6. The method of claim 4 in which said system contains I/O ports designated by addresses in an I/O address space recognized by the processors of said system; said processors are adapted individually to recognize a plurality of privilege levels in respect to permitting access to said I/O ports; said plurality of privilege levels including a highest level, a lowest level, and at least one intermediate level; and in which said instructions of one class are used in program tasks requiring access to said I/O ports; and wherein determining whether said instructions of one class require preventing servicing of external interrupt requests comprises:

recognizing only said highest and lowest privilege levels;

changing each said intermediate privilege level to a predetermined one of said highest and lowest privilege levels; and asserting an exception upon each execution of an instruction of said one class requiring the processor executing the respective instruction to determine if the respective instruction requires preventing servicing of external interrupt requests, and in that event to acquire exclusive control of said spinlock.

7. A method for providing external interrupt serialization in a multiprocessor environment during execution of program tasks written to run in a uniprocessor environment; said method comprising:

a. during each execution of a said program task written to run in a said uniprocessor environment, acquiring control of a spinlock located in memory shared by all processors operating in said multiprocessing environment, and retaining said control of said spinlock if and only if the respective program task is one requiring that its execution not be interrupted by servicing of external interrupt requests;

b. receiving an external interrupt request during execution of a said program task written to run in a uniprocessor environment;

c. upon receipt of said external interrupt request, checking the state of said spinlock; and c.1. if the spinlock is in said acquired state, repeatedly checking the spinlock until it is in said freely accessible state c.2. if the spinlock is in said freely accessible state c.2.1. changing the state of said spinlock to said acquired state and processing said external interrupt request.

8. A method for protecting execution state of program tasks running in a multiprocessor environment from external interrupts, where said program tasks are written to run in a uniprocessor environment, said method comprising:

a. providing each said program task with an instruction selectively preventing or permitting servicing of external interrupt requests by a processor executing the respective task;

b. during execution of each said instruction preventing or permitting servicing, determining if the respective instruction requires preventing servicing of external interrupt requests, and, if it does, requiring the processor executing the instruction to acquire exclusive control of a spinlock located in memory shared by all processors operating in said multiprocessor environment; and c. requiring each processor operating in said multiprocessor environment, and receiving an extenal interrupt request, to test said spinlock and acquire exclusive control of said spinlock before servicing the respectively received request, and, if said spinlock is in an acquired state when tested by a processor receiving a said external interrupt request, requiring the respective processor to repeatedly test the spinlock until it is in a state permitting the respective processor to acquire said exclusive control.

* * * * *